US009321869B2

(12) United States Patent
Millard et al.

(10) Patent No.: US 9,321,869 B2
(45) Date of Patent: Apr. 26, 2016

(54) CATIONIC POLYMERS

(71) Applicant: BASF SE, Ludwigshafen (DE)

(72) Inventors: Pierre-Eric Millard, Altenmarkt (DE); Gregor Herth, Trostberg (DE); Stefan Friedrich, Garching (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/561,462

(22) Filed: Dec. 5, 2014

(65) Prior Publication Data

US 2015/0087796 A1 Mar. 26, 2015

Related U.S. Application Data

(63) Continuation of application No. 13/861,710, filed on Apr. 12, 2013.

(60) Provisional application No. 61/623,596, filed on Apr. 13, 2012.

(51) Int. Cl.
*C08F 2/46* (2006.01)
*C08G 61/04* (2006.01)
*C08F 18/00* (2006.01)
*C08F 20/00* (2006.01)
*C08F 2/00* (2006.01)
*C08F 220/34* (2006.01)
*C08F 222/38* (2006.01)
*C08F 226/02* (2006.01)
*C08F 226/04* (2006.01)

(52) U.S. Cl.
CPC ............. *C08F 220/34* (2013.01); *C08F 222/38* (2013.01); *C08F 226/02* (2013.01); *C08F 226/04* (2013.01)

(58) Field of Classification Search
CPC .... C08F 220/34; C08F 222/38; C08F 226/02; C08F 226/04
USPC .............. 526/292.2, 292.1, 291, 72; 522/175, 522/174, 173, 1; 520/1
See application file for complete search history.

(56) References Cited

U.S. PATENT DOCUMENTS

| 3,734,873 | A | 5/1973 | Anderson et al. |
| 4,749,444 | A | 6/1988 | Lorz et al. |
| 4,808,683 | A | 2/1989 | Itagaki et al. |
| 4,957,977 | A | 9/1990 | Itagaki et al. |
| 5,037,927 | A | 8/1991 | Itagaki et al. |
| 5,064,909 | A | 11/1991 | Itagaki et al. |
| 5,137,641 | A | 8/1992 | Bhattacharyya et al. |
| 5,225,088 | A | 7/1993 | Moench et al. |
| 5,681,912 | A | 10/1997 | Kuo et al. |
| 6,605,674 | B1 | 8/2003 | Whipple et al. |
| 7,084,205 | B2 | 8/2006 | Norman et al. |
| 7,776,958 | B2 | 8/2010 | Strominger et al. |
| 2004/0091444 | A1 | 5/2004 | Loffler et al. |
| 2005/0239957 | A1 | 10/2005 | Pillsbury et al. |
| 2006/0116470 | A1* | 6/2006 | Gauweiler et al. ............ 524/800 |
| 2011/0155339 | A1 | 6/2011 | Brungardt et al. |

FOREIGN PATENT DOCUMENTS

| EP | 0 102 760 A2 | 3/1984 |
| EP | 126 528 A2 | 11/1984 |
| EP | 0 150 933 A2 | 8/1985 |
| EP | 0 170 394 A2 | 2/1986 |
| EP | 0 235 893 A1 | 9/1987 |
| EP | 96/33228 | 10/1996 |
| EP | 0 821 704 | 2/1998 |
| EP | 01/25289 A1 | 4/2001 |
| EP | 1 396 508 A1 | 3/2004 |
| JP | 2002-363890 | * 12/2002 |
| JP | 2003-073566 | * 3/2003 |
| WO | 98/31748 | 7/1998 |
| WO | 98/31749 | 7/1998 |
| WO | 2005/095292 A1 | 10/2005 |
| WO | 2006/004745 A1 | 1/2006 |

OTHER PUBLICATIONS

Tanaka, JP 2002-363890 Machine Translation, Dec. 18, 2002.*
Takeda et al, JP 2003-073566 Machine Translation, Mar. 12, 2003.*
Wang et al, Vinylformamide-based cationic polymers as retention aids in alkaline peapermaking, Jul. 24, 2002, Tappi Journal, vol. 2, No. 12, 21-26.*
Search Report issued Jul. 11, 2012 in European Application No. EP 12 16 4088.
International Search Report issued May 16, 2013 in Application No. PCT/EP2013/057237.
Agnieszka Ubowska, et al., "Cationic acrylamide copolymers and terpolymers as flocculants for model aqueous suspensions", Polimery, vol. 55, No. 4, 2010, pp. 299-305.
Fei Wang, et al., "Vinylformamide-based cationic polymers as retention aids in alkaline papermaking", Tappi Journal, vol. 2, No. 12, 2002, pp. 21-26.
Tanaka, JP 2002-363890 English Translation.
Takeda et al., JP 2003-073566 English Translation.

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P

(57) ABSTRACT

New water soluble cationic copolymers derived from N-vinyl amide monomers and ethylenically unsaturated compounds bearing cationic groups.

9 Claims, No Drawings

CATIONIC POLYMERS

CROSS REFERENCE TO RELATED APPLICATION

This application is a continuation of U.S. application Ser. No. 13/861,710, filed on Apr. 12, 2013, which claims the benefit of U.S. provisional Application No. 61/623,596, filed on Apr. 13, 2012.

This invention is related to new water soluble cationic copolymers derived from N-vinyl amide monomers and ethylenically unsaturated compounds bearing cationic groups.

Another aspect of the invention is a process for the preparation of such copolymers.

Another aspect of the invention relates to the use of such copolymers as flocculants.

The flocculation of suspended matter in water to enhance the clarification and purification of water is an important aspect of industrial and municipal water treatment. Flocculation is the agglomeration of coagulated colloidal and finely divided suspended matter by physical mixing or chemical coagulant aids. Polymeric organic coagulants such as cationic polyamines and high molecular weight polyacrylamides have been used to aid flocculation and are often used in combination with inorganic coagulants such as lime, alum, ferric chloride, ferrous sulfate, ferric sulfate and sodium aluminate.

Cationic copolymers are used in such applications as flocculating agents. Conventionally known cationic polymers include acrylamide-based copolymers ammonium salts of dialkylaminoalkyl(meth)acrylates and Hofmann degradation or Mannich reaction products of polyacrylamides.

A typical sewage treatment plant takes in raw sewage and produces solids and clarified water. Typically the raw sewage is treated in a primary sedimentation stage to form a primary sludge and supernatant, the supernatant is subjected to biological treatment and then a secondary sedimentation stage to form a secondary sludge and clarified liquor, which is often subjected to further treatment before discharge.

The sludges are usually combined to form a mixed sewage sludge which is then dewatered to form a cake and a reject liquor. The reject liquor is usually recycled to the head of the plant and the start of the process, i.e., fed back to the primary sedimentation stage or a preceding stage in the plant. Any water which is required in the plant, for instance for dissolving polymeric flocculant, is usually either potable water (from the local drinking water supply) or is clarified water from the secondary sedimentation stage, optionally after any subsequent treatment procedures. It is standard practice to dewater the sludge by mixing a dose of polymeric flocculant into that sludge at a dosing point, and then substantially immediately subjecting the sludge to the dewatering process and thereby forming a cake and a reject liquor. The dewatering process may be centrifugation or may be by processes such as filter pressing or belt pressing.

Another important application for cationic polymers is their use as drainage and retention aids in the paper industry. Retention is a term used in papermaking to denote the extent to which the pulp fibers and other additives which are added to the furnish are retained in the finished paper. The retention of pulp fibers, fines, sizing agents, fillers and other additives in the paper sheet during its formation in a paper making machine is an important problem. A retention aid generally acts by increasing the flocculating tendency of the pulp fibers and additives to inhibit their loss during drainage through the paper machine wires or screens.

Numerous factors affect the efficiency of retention aids including 1) variables in the furnish such as pH, consistency, temperature, type of pulp fiber (e.g., fiber length, degree of refining, etc.), and white water recirculation (e.g. degree of system closure), 2) conditions of the wire or screens such as wire mesh size, machine speed, etc. and 3) factors relating to the additives such as the dosage amount of additives, order of additives, form, shape and density of particles and ionic balance.

Drainage is another papermaking requirement that often conflicts with retention, and requires a rapid reduction in water content of an aqueous pulp suspension in the sheet forming areas of a paper machine. Aqueous pulp suspensions contain more than 99% water. To convert an aqueous pulp suspension to a finished paper sheet requires a rapid reduction in water content to a level of about 6%. Drainage rates are dependent upon numerous factors including the arrangement of the drainage elements in the paper making machine, (e.g., arrangement of free drainage areas vis-a-vis vacuum assistance area), characteristics of the wires, screens or fabric, furnish characteristics (e.g. freeness, additives, etc.), furnish thickness, temperature, furnish consistency and wire speed. Suitable retention/drainage aids must not only inhibit the undue loss of fibers and additives, but they must also promote rapid drainage of water from the pulp suspension. Numerous retention/drainage aids are known and are available to paper makers.

EP 235 893 describes the use of a combination of organic, substantially linear synthetic polyacrylamide copolymers and bentonite to improve drainage/retention in papermaking.

U.S. Pat. No. 4,749,444 discloses a process for production of paper and cardboard by adding to the paperstock a three component mixture comprising an activated bentonite, a cationic polyelectrolyte having a charge density not less than 4 mEq/g and a high molecular weight acrylamide or methacrylamide copolymer having an average molecular weight from 1 to 20 million.

U.S. Pat. No. 4,808,683 discloses copolymers containing vinylamine, N-vinylformamide and N-monosubstituted or N,N-disubstituted acrylamide for use as flocculating agents, drainage aids and paper strength increasing agent.

U.S. Pat. No. 4,957,977 and U.S. Pat. No. 5,064,909 disclose vinylamine containing copolymers by copolymerizing N-vinylformamide and (meth)acrylonitrile and then hydrolyzing the resulting copolymers with an acid. These copolymers are useful as flocculating agents and paper strength increasing agents.

U.S. Pat. No. 5,037,927 discloses copolymers of N-vinylformamide and alkyl(meth)acrylate and their hydrolyzed products.

U.S. Pat. No. 7,084,205 discloses polymeric compositions for dewatering sewage sludges.

WO 06/004745 discloses an inverse emulsion polymer having a dispersed phase composed of an aqueous solution of an acrylic polymer and a continuous phase composed of an ester of a fatty acid and a water-soluble alcohol.

U.S. Pat. No. 5,225,088 discloses copolymers of vinylformamide and N-substituted acrylamides or divinyldialkyl ammonium salts, wherein vinylformamide is comprised in amounts between 50 and 80 molar percent.

EP 821 704 discloses water soluble cationic copolymers comprising a reaction product of N-vinylamides with diallyl ammonium chloride derivatives or acrylic esters bearing an ammonium groups or vinyl pyridine and their use as flocculants and drainage retention aids.

Cationic polyacrylamide polymers used for waste water treatment or in paper industry always contain some residual monomeric acrylamide. While polymerized acrylamide is harmless, N-unsubstituted acrylamide monomer (referred to as "acrylamide") is highly toxic.

It was therefore an object of the invention to provide novel copolymers that are free of acrylamide and that show good performance as flocculating agents. In particular, it was an object of the invention to provide copolymers that show improved performance as flocculating agents for sludge dewatering in waste water treatment.

It was another object of the invention to provide a method for preparing novel copolymers described herein. Ideally such processes should allow to make copolymers according to the invention with high molecular weights and high intrinsic viscosities.

To achieve the objectives of the invention, novel water soluble cationic copolymers P have been found that comprise in the form of polymerized units a) at least one vinylamide of the general formula I

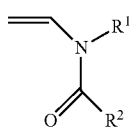

wherein $R^1$ and $R^2$ are independently H, $C_1$, $C_2$ or $C_3$ alkyl, and b) at least one compound of the general formula II

wherein $R^3$ is H or $C_1$, $C_2$ or $C_3$ alkyl,
Y is

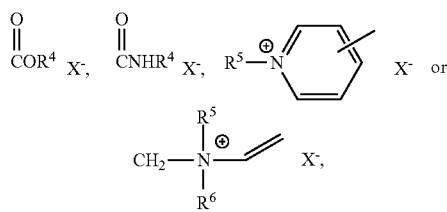

$R^4$ is an aliphatic, cycloaliphatic or aromatic rest bearing a positive charge,
$R^5$ and $R^6$ are independently $C_1$ to $C_3$ alkyl,
$X^-$ is an anion,
wherein the molar ratio of components a) to b) is 5:95 to 80:20.

Preferably, the molar ratio of components a) to b) is 5:95 to 45:65, more preferably 10:90 to 40:60 and particularly preferably 15:85 to 30:70.

In a preferred embodiment, $R^1$ is H.
In another preferred embodiment, $R^1$ in $CH_3$.
In another preferred embodiment, $R^2$ is H or methyl.
Examples of preferred vinyl amides a) are N-vinyl formamide ($R^1=R^2=H$) and N-vinyl acetic amide ($R^1=H$, $R^2=CH_3$).

Copolymer P may also comprise mixtures of different vinyl amides a).

Compounds suitable as component b) carry a positive charge. In a preferred embodiment, compounds suitable as component b) carry a permanent positive charge. In a less preferred embodiment, component b) is zwitterionic or are cationic only at low pH. Normally, component b) comprises an anion $X^-$ that can for example be selected from pseudo halides or halides like $Cl^-$, $Br^-$ or $I^-$; hydroxide, sulfates, carboxylates or alkylsulfonates like $C_1$-$C_3$ alkyl sulfonates. In a preferred embodiment, anions $X^-$ are selected from $Cl^-$, $OH^-$ or alkylsulfonates like $CH_3SO_4$.

Preferably, component b) bears a quarternary ammonium group or a pyridinium group.

In a preferred embodiment, $R^3$ is H or $CH_3$. More preferably, $R^3$ is H.

Preferably, component b) is a derivative of (meth)acrylic acid bearing cationic groups or a quaternized vinyl pyridine.

In a preferred embodiment, component b) is an ester or an amide of acrylic acid or methacrylic acid or a vinylpyridinium salt. In a particularly preferred embodiment, component b) is an ester of acrylic acid or methacrylic acid or a vinylpyridinium salt.

Preferably, $R^4$ is selected from $[(CH_2)_n NR^5R^6R^7]^+X^-$. n is a number from 1 to 8, preferably from 1 to 5, more preferably from 1 to 3.

In a preferred embodiment, component b) is selected from

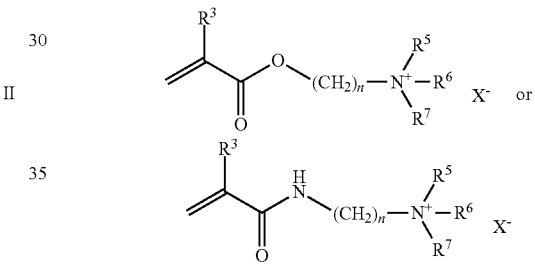

$R^5$, $R^6$ and $R^7$ are independently substituted or unsubstituted benzyl or $C_1$ to $C_{12}$ alkyl, and preferably methyl or ethyl. In a particularly preferred embodiment, $R^5$, $R^6$ and $R^7$ are methyl.

Particularly preferred components b) are N,N-dimethylaminoethyl acrylate methyl chloride, Acryloyloxyethyltrimethyl ammonium chloride, Acryloyloxyethyltrimethyl ammonium hydroxide, Acryloyloxypropyltrimethyl ammonium chloride, Methacryloyloxyethyltrimethyl ammonium chloride, N,N-dimethylaminopropylacrylamide methyl chloride.

Copolymer P may also comprise mixtures of different cationic monomers b).

When Y represents

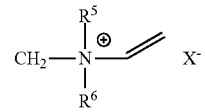

(also written as —$CH_2N^+(R^5R^6)CH_2CH=CH_2X^-$) in forming the cationic quaternary amine monomer ($CH2=CR^3Y$) which is then a diallyl dialkylammonium salt monomer used to form the copolymer P, it is understood that this Y group comprises an ethylenic unsaturation which can further take part in the copolymerization and thereby (i) form part of the same copolymer chain on a head-to-head configuration, (ii)

form part of the same copolymer chain on a head-to-tail configuration, (iii) form part of a different copolymer chain, or (iv) remain unreacted.

In one embodiment of the invention, copolymer P may comprise up to 15% by weight, preferably up to 10% by weight, more preferably up to 5% by weight and particularly preferably up to 2% by weight of further monomers.

Further monomers can be cationic, anionic, hydrophobic or neutral and can be any monomers that comprise an ethylenically unsaturated double bond like (meth)acrylic acid, (meth)acrylic acid derivatives like (meth)acrylic acid esters, (meth)acrylic amides, styrene, substituted styrenes like alpha methyl styrene, acrylic nitrile, vinyl esters like vinyl acetate, vinyl propionate. unsaturated dicarboxylic acids like crotonic acid, itaconic acid, maleic acid, maleic acid anhydride, olefins like ethylene.

In a particularly preferred embodiment, copolymer P is free of acrylamide.

In a more preferred embodiment, copolymer P consists essentially of components a) and b).

In a particularly preferred embodiment, copolymer P does not comprise any further monomers but consists of components a) and b).

Especially preferred are copolymers P consisting of Vinylformamide and Acryloyloxyethyltrimethyl ammonium chloride.

In one preferred embodiment, copolymers P comprise 55 to 95 molar % methyl chloride quaternary ammonium salt of dimethyl amino ethyl(meth)acrylate and 5 to 45% vinyl formamide.

Copolymers P normally have an average molecular weight Mw (determined by light scattering) of 10,000 to 100,000,000, preferably 100,000 to 70,000,000, more preferably 500,000 to 30,000,000. In a preferred embodiment, copolymers P have a molecular weight above 1,000,000. In a particularly preferred embodiment, copolymers P have a molecular weight above 4,500,000 or 5,000,000. In an especially preferred embodiment copolymers P have an average molecular weight above 6,000,000, above 8,000,000 or above 10,000,000.

The term "average molecular weight" in the context of this application means the weight average molecular weight Mw.

The average molecular weight Mw can be determined by light scattering using a field flow fractionation apparatus coupled with a multi-angle Light scattering detector and a refractive index detector.

In one embodiment of the invention, copolymer P comprises in the form of polymerized units a) at least one compound of the general formula I

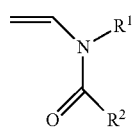

wherein $R^1$ and $R^2$ are independently H, $C_1$, $C_2$ or $C_3$ alkyl, and b) at least one compound of the general formula II

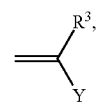

wherein $R^3$ is H or $C_1$, $C_2$ or $C_3$ alkyl,

Y is

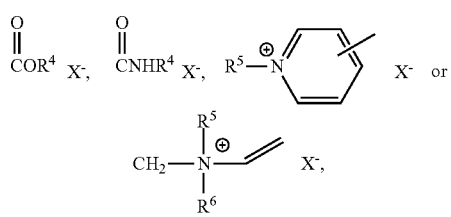

$R^4$ is an aliphatic or cycloaliphatic or aromatic rest bearing a positive charge, $R^5$ and $R^6$ are independently $C_1$ to $C_3$ alkyl, $X^-$ is an anion, wherein the molar ratio of components a) to b) is 5:95 to 80:20, and wherein said copolymer P has a number average molecular weight of 5,000,000 to 100,000,000.

The molecular weight of the copolymers can for example be controlled by the method of copolymerization, the copolymerization temperature, the type and amount of initiator, the concentration of monomers and the like. Generally, lower temperature and higher monomer concentration produce a higher molecular weight copolymers while higher temperature and lower monomer concentration produce lower molecular weight copolymers. The monomer concentrations in the reaction mixture are generally in the range of 5 to 70% by weight, and are preferably between 10 to 60% by weight.

Normally copolymer P is a polymer that exhibits an intrinsic viscosity of at least 0.5 dl/g. Typically, the intrinsic viscosity will be the least 3 dl/g, preferably 5 dl/g and often it can be as high as 20 or 30 dl/g. Preferably the intrinsic viscosity will be from 5 to 20 dl/g.

Intrinsic viscosity is a parameter used to characterize the molecular weight and the structure of the polymer. Longer polymers have a higher intrinsic viscosity compared to shorter ones and branched polymers have a lower intrinsic viscosity compared to linear ones of same molecular weight.

The intrinsic viscosity of polymers may be determined as described in WO 2005/095292 p. 8, ln. 29 to p. 9, ln 5 by preparing an aqueous solution of the polymer (0.5-1% w/w) based on the active content of the polymer. 4 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionized water) and the mixture is diluted to 100 mL with deionized water. The intrinsic viscosity of the polymers is measured using a "Number 1 suspended level viscometer" at 25° C. in 1M sodium chloride solution that is buffered to pH 7.0.

In one embodiment of the invention, copolymer P comprises in the form of polymerized units
a) at least one compound of the general formula I

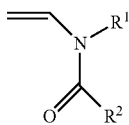

wherein $R^1$ and $R^2$ are independently H, $C_1$, $C_2$ or $C_3$ alkyl,
and
b) at least one compound of the general formula II

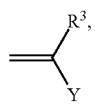

wherein $R^3$ is H or $C_1$, $C_2$ or $C_3$ alkyl,
Y is

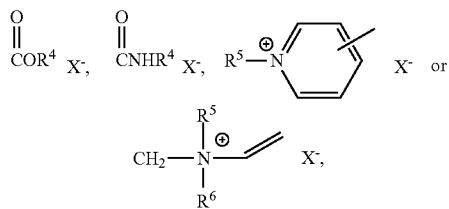

$R^4$ is an aliphatic or cycloaliphatic or aromatic rest bearing a positive charge,
$R^5$ and $R^6$ are independently $C_1$ to $C_3$ alkyl,
$X^-$ is an anion,
wherein the molar ratio of components a) to b) is 5:95 to 80:20,
and wherein said copolymer P has an intrinsic viscosity from 5 to 30 dl/g.

Copolymers P normally do not comprise more than 10,000 ppm of unreacted monomer. Preferably, copolymers P do not comprise more than 1000 ppm or 600 ppm. In a particularly preferred embodiment, copolymers P do not comprise more than 400 or 200 ppm of unreacted monomer.

Copolymers P and HP may be formed by any polymerization process suitable for obtaining such copolymers and that is preferably suitable for obtaining copolymers with a number average molecular weight of 5,000,000 to 100,000,000.

For example, copolymers P may be prepared by gel polymerization, water-in-oil suspension polymerization or by water-in-oil emulsion polymerization or inverse emulsion polymerization or by water-in-water dispersion polymerization. These processes allow for a time and energy efficient process for making copolymers according to the invention and enable the manufacture of copolymers with a high average molecular weight.

When preparing gel polymers by solution polymerization, the initiators are generally introduced into the monomer solution.

Gel polymers can for example be prepared using redox initiation in an adiabatic process. Redox initiation systems are generally composed of two parts, an oxidizing component and a reducing component. Examples of oxidizing components which can be used in the present invention are hydroperoxide and alkali metal or ammonium salts of a per-acid, such as alkali metal and ammonium peroxodisulfates (commonly known as persulfates) and alkali metal and ammonium perborates.

Examples of reducing components which can be used in the present invention are alkali metal and ammonium sulfites, disulfites, hydrosulfites, thiosulfites and formaldehydesulfoxylates, and salts of transition metals such as iron ($Fe^{2+}$), chromium ($Cr^{2+}$), vanadium ($V^{2+}$) and titanium ($Ti^{3+}$). In addition to the oxidizing and reducing components certain other compounds may be present which help solubilisation of one or more components of the system. Examples of such compounds are complexing agents such as the disodium salt of ethylenediamine tetraacetic acid or pentasodium salt of diethylenetriaminepentaacetic acid. A particularly preferred redox system comprises ammonium or potassium persulfate or tert-butyl hydroperoxide or hydrogen peroxide and ferrous salts such as ferrous sulfate or ferrous ammonium sulfate or sodium metabisulfite. The amounts used are preferably in the ranges 0.00001 to 0.01% by weight relative to the monomer solution for the oxidizing component and 0.00001 to 0.0045% by weight relative to the monomer solution for the reducing agent.

Optionally a thermal initiator system may be included. Typically a thermal initiator would include any suitable initiator compound that releases radicals at an elevated temperature. Suitable free-radical initiators include, but are not limited to, azo initiators, peroxide initiators, persulfate initiators and free radical redox systems. Especially preferred are water soluble azo initiators such as azo-bis-isobutyronitrile, 2,2'-azobis(N,N'-dimethyleneisobutyramidine)dihydrocholoride, 2,2'-azobis(2-amidinopropane)dihydrochloride, 4,4'-azobis-(4-cyanopentanoic acid), 2,2'-azobis{2-methyl-N-[1,1-bis(hydroxymethyl)-2-hydroxyethyl]propionamide}, and 2,2'-azobis(2-methyl-N-(2-hydroxyethyl)propionamide). The free-radical initiator is usually used in an amount of 0.0001 to 1% by weight based on the weight of the total monomers.

The aqueous monomer phase is prepared by mixing water-soluble monomers and polymerization additives such as inorganic salts, chelants, pH buffers, transfer agents, crosslinker, initiators and the like in water. Crosslinking agents and transfer agents may be optionally be used to increase the molecular weight and trigger the intrinsic viscosity of the polymers obtained. The monomer solution is normally cooled to −10° C.-10° C. and degassed to remove oxygen present. The reaction can be carried out under an inert gas atmosphere. The copolymerization reaction is usually initiated by introducing the redox initiator solutions to the monomer solution at −5° to 20° C., preferably around 0° C. Preferably, the temperature during polymerization is let to rise to at least 70° C. but preferably below 95° C.

Alternatively the gel polymerization may be carried out under irradiation (ultra violet (UV) light, microwave energy, heat etc.), preferably under UV light optionally also using suitable radiation initiators.

In one embodiment, polymerization is effected by a combination of redox and UV-polymerization processes. This implies the presence of two different types of radical initiators, a redox system as described earlier and a UV initiator. Preferred UV-initiators are for example water-soluble azo initiators as listed above. Suitable UV initiators are available under the trade name Irgacure® from BASF SE. More details of suitable processes are disclosed in WO 2001/025289 A1 p. 5, ln 15 to p. 14, ln 13.

Gel polymerization, inverse emulsion polymerization and polymerizations induced by UV are particularly efficient with respect to the reaction time and the energy efficiency.

Using polymerization techniques selected from gel polymerization, inverse emulsion polymerization and polymerizations induced by UV it is possible to vary the ratio of components a) to b) over broad ranges and to obtain these products in high quality (little side products, high purity, homogenous powder, easily grindable powder). Furthermore, it is possible to make polymers that comprise component a) in an amount from 5 to 80% by weight, preferably between 10 to 45% by weight, more preferably from 15 to 45% by weight, 20 to 30% by weight.

Once the polymerization is complete, the gel can be processed in a standard way by first comminuting the gel into smaller pieces, drying to the substantially dehydrated polymer followed by grinding to a powder.

The polymers may be produced as beads ("bead polymerization") by suspension polymerization or as a water-in-oil emulsion or dispersion by water-in-oil emulsion polymerization, for example according to a process defined by EP-A-150933, EP-A-102760 or EP-A-126528. Alternatively the water soluble polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerization of aqueous monomers in the presence of an aqueous medium containing dissolved low IV (intrinsic viscosity) polymers such as poly diallyl dimethyl ammonium chloride and optionally other dissolved materials for instance electrolyte and/or multi-hydroxy compounds e.g. polyalkylene glycols, as given in WO-A-9831749 or WO-A-9831748.

Aqueous solutions of water-soluble copolymers P are typically obtained by dissolving the polymer in water. Generally solid particulate polymer, for instance in the form of powder or beads, is dispersed in water and allowed to dissolve with agitation. This may be achieved using conventional make up equipment. The polymer may be supplied in the form of a reverse phase emulsion or dispersion which can then be inverted into water.

The copolymers may be produced in a liquid form by inverse emulsion polymerization. An inverse emulsion means a water-in-oil polymer emulsion comprising the polymers according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 5,137,641, incorporated herein by reference. Representative preparations of high molecular weight inverse emulsion polymers are described U.S. Pat. Nos. 6,605,674; 7,776,958; and 5,137,641.

The aqueous phase is prepared by mixing water-soluble monomers, and any polymerization additives such as inorganic salts, chelants, pH buffers, transfer agent, crosslinker, initiator and the like in water.

The oil phase is prepared by mixing together an inert hydrocarbon liquid with one or more oil soluble surfactants. The surfactant mixture should have a low HLB, to ensure the formation of an oil continuous emulsion. Appropriate surfactants for water-in-oil emulsion polymerizations, which are commercially available, are compiled in the North American Edition of McCutcheon's *Emulsifiers & Detergents, International Edition Volume* 1 (1994) p. 209 to p. 228. The oil phase may need to be heated to ensure the formation of a homogenous oil solution.

The monomer phase is added to the oil phase and they are vigorously mixed together using a mixing equipment to form an emulsion. The media is then charged into a reactor equipped with a stirrer, a thermocouple, a nitrogen purge tube, and a condenser. The resulting emulsion is cooled or heated to the desired temperature, purged with nitrogen, and a free-radical initiator is added. The reaction mixture is stirred for several hours until the reaction is completed under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873, col 4, ln 43 to col 6, ln 44) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873, col 4, ln 43 to col 6, ln 44).

A way of increasing the molecular weight and controlling the intrinsic viscosity of the polymer is to introduce a structural modifier in the formulation or during the polymerization process. A structural modifier is an agent that is added to the aqueous polymer solution to control the polymer structure and solubility characteristics. The structural modifier is selected from the group consisting of cross-linking agents and chain transfer agents.

Chain transfer agent means any molecule, used in free-radical polymerization, which will react with a polymer radical forming a dead polymer and a new radical. In particular, adding a chain transfer agent to a polymerizing mixture results in a chain-breaking and a concomitant decrease in the size of the polymerizing chain. Thus, adding a chain transfer agent limits the molecular weight of the polymer being prepared.

Suitable chain transfer agents include alcohols such as methanol, ethanol, 1-propanol, 2-propanol, butyl alcohol, and glycerol, and the like, sulfur compounds such as alkylthiols, thioureas, sulfites, and disulfides, carboxylic acids such as formic and malic acid, and their salts and phosphites such as sodium hypophosphite, and combinations thereof. A preferred alcohol is 2-propanol. Preferred sulfur compounds include ethanethiol, thiourea, and sodium bisulfite. Preferred carboxylic acids include formic acid and its salts. More preferred chain-transfer agents are sodium hypophosphite and sodium formate.

Cross-linking agent or branching agent means a multifunctional monomer that when added to polymerizing monomer or monomers results in cross-linked polymers in which a branch or branches from one polymer molecule become attached to other polymer molecules. Preferred cross-linkers are polyethylenically unsaturated monomers.

Preferred cross-linking agents include N,N-methylenebisacrylamide, N,N-methylenebismethacrylamide, triallylamine, triallyl ammonium salts, tetraallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidylacrylate, acrolein, glyoxal and vinyltrialkoxysilanes such as vinyltrimethoxysilane, vinyltriethoxysilane, vinyltris(1'-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltriocty loxysilane, vinylmethoxydilauryloxysilane, vinyldimethoxylauryloxysilane, vinylmethoxydioleyoxysilane, and vinyldimethoxyoleyloxysilane. Especially preferred cross-linking agents are N,N-methylenebisacrylamide, N,N-methylenebismethacrylamide and tetraallyl ammonium salts.

The present invention is further directed to novel copolymers HP comprising in the form of polymerized units:
a) at least one vinylamide of the general formula I

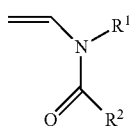

wherein $R^1$ and $R^2$ are independently H, $C_1$, $C_2$ or $C_3$ alkyl,
and
b) at least one compound of the general formula II

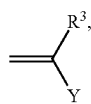

wherein $R^3$ is H or $C_1$, $C_2$ or $C_3$ alkyl,
Y is

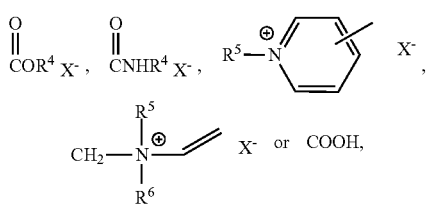

$R^4$ is an aliphatic or cycloaliphatic or aromatic rest bearing a positive charge,
$R^5$ and $R^6$ are independently $C_1$ to $C_3$ alkyl,
X is an anion,
with the proviso that the amount of compounds where Y is COOH does not exceed 80 molar % of the amount of compounds making up component b),
c) at least one compound of the general formula III

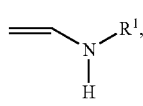

wherein the stoichiometric composition of said copolymer is reflected by the formula $A_xB_yC_z$, wherein A, B and C represent components a), b) and c) in polymerized form, and wherein the molar ratio of (x+z):y is from 5:95 to 80:20 and the molar ratio of x:z is 0 to 100000

Depending on the pH or the acidity of the medium, compounds of the general formula III are present as amines or as ammonium ions and a counterion. In the context of this application, ammonium salts of amines according to formula III shall also be regarded as compounds according to formula III.

Preferably, the molar ratio of components a) and c) to b) (the molar ratio (x+z):y) in copolymer HP is 5:95 to 45:65, more preferably 10:90 to 40:60 and particularly preferably 15:85 to 30:70.

In one embodiment of the invention, the molar ratio x:z is from 0 to 10, preferably from 0.1 to 8, more preferably from 0.5 to 5.

In another embodiment of the invention, the molar ratio x:z is from 10 to 100,000, preferably from 100 to 10,000. In a preferred embodiment, the molar ratio x:z is above 1000.

In a preferred embodiment, $R^1$ is H.
In another preferred embodiment, $R^1$ is $CH_3$.
In another preferred embodiment, $R^2$ is H or methyl.
Examples of preferred vinyl amides a) are N-vinyl formamide ($R^1=R^2=H$) and N-vinyl acetic amide ($R^1=H$, $R^2=CH_3$).

Compounds suitable as component b) carry a positive charge. In a preferred embodiment, compounds suitable as component b) carry a permanent positive charge. In a less preferred embodiment, component b) is zwitterionic or are cationic only at low pH. Normally, component b) comprises an anion $X^-$ that can for example be selected from pseudo halides or halides like $Cl^-$, $Br^-$ or $I^-$; hydroxide, sulfates, carboxylates or alkylsulfonates like $C_1$-$C_3$ alkylsulfonates. In a preferred embodiment, anions X are selected from $Cl^-$, $OH^-$ or alkylsulfonates like $CH_3SO_4^-$.

Preferably, component b) bears a quarternary ammonium group or a pyridinium group.

In a preferred embodiment, $R^3$ is H or $CH_3$. More preferably, $R^3$ is H.

Preferably, component b) is a derivative of (meth)acrylic acid bearing cationic groups or a quaternized vinyl pyridine.

In a particularly preferred embodiment, component b) is an ester or an amide of acrylic acid or methacrylic acid. In a particularly preferred embodiment, component b) is an ester or amide of acrylic acid.

In another embodiment of the invention, when copolymer HP is prepared by hydrolysis of copolymers P, component b) is preferably not an ester, because esters tend to by hydrolyzed more easily that amides.

Preferably, $R^4$ is selected from $[(CH_2)_nNR^5R^6R^7]^+X^-$. n is a number from 1 to 8, preferably from 1 to 5, more preferably from 1 to 3.

In a preferred embodiment, component b) is selected from

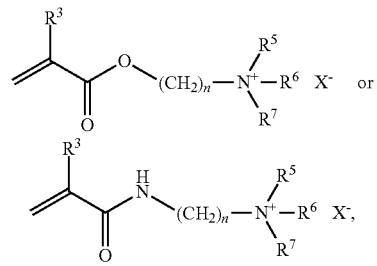

$R^5$, $R^6$ and $R^7$ are independently $C_1$ to $C_3$ alkyl, and preferably methyl or ethyl. In a particularly preferred embodiment, $R^5$, $R^6$ and $R^7$ are methyl.

Preferred components b) are for example N,N-dimethylaminoethyl acrylate methyl chloride, Acryloyloxyethyltrimethyl ammonium chloride, Acryloyloxyethyltrimethyl ammonium hydroxide, Acryloyloxypropyltrimethyl ammonium chloride, Methacryloyloxyethyltrimethyl ammonium chloride, N,N-dimethylaminopropylacrylamide methyl chloride.

Particularly preferred compounds b) for copolymers HP are N,N-dimethylaminopropyl acrylamide methyl chloride It is possible that during hydrolysis of copolymer P, ester or amide groups originating from component b) can also be partially hydrolyzed. Thus, in copolymers HP, Y can also be COOH, provided that the molar ratio compounds b) bearing a COOH group (Y=COOH) does not exceed 80 molar %, preferably 50, more preferably 30 and especially preferably 10 molar % relative to the amount of component b) originally included in the polymer.

Copolymer HP may also comprise mixtures of different cationic monomers b).

When Y represents

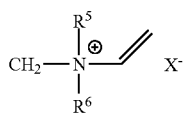

(also written as —CH$_2$N$^+$(R$^5$R$^6$)CH$_2$CH=CH$_2$X$^-$) in forming the cationic quaternary amine monomer (CH$_2$=CR$^3$Y) which is then a diallyl dialkylammonium salt monomer used to form the copolymer HP, it is understood that this Y group comprises an ethylenic unsaturation which can further take part in the copolymerization and thereby (i) form part of the same copolymer chain on a head-to-head configuration, (ii) form part of the same copolymer chain on a head-to-tail configuration, (iii) form part of a different copolymer chain, or (iv) remain unreacted.

In one embodiment of the invention, copolymer HP may comprise up to 15% by weight, preferably up to 10% by weight, more preferably up to 5% by weight and particularly preferably up to 2% by weight of further monomers.

Further monomers can be cationic, anionic, hydrophobic or neutral and can be any monomers that comprise an ethylenically unsaturated double bond like (meth)acrylic acid, (meth)acrylic acid derivatives like (meth)acrylic acid esters, (meth)acrylic amides, styrene, substituted styrenes like alpha methyl styrene, acrylic nitrile, vinyl esters like vinyl acetate, vinyl propionate. unsaturated dicarboxylic acids like crotonic acid, itaconic acid, maleic acid, maleic acid anhydride, olefins like ethylene.

In a particularly preferred embodiment, copolymer HP is free of acrylamide.

Copolymers HP normally have an average molecular weight Mw (determined by light scattering of at 10,000 to 100,000,000, preferably 100,000 to 70,000,000, more preferably 500,000 to 30,000,000. In a preferred embodiment, copolymers P have a molecular weight above 1,000,000. In a particularly preferred embodiment, copolymers P have a molecular weight above 4,500,000 or 5,000,000. In an especially preferred embodiment copolymers P have a molecular weight above 6,000,000, above 8,000,000 or above 10,000,000.

In one embodiment, copolymer HP comprises in the form of polymerized units:

a) at least one compound of the general formula I

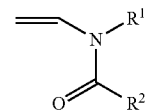

wherein $R^1$ and $R^2$ are independently H, $C_1$, $C_2$ or $C_3$ alkyl, and b) at least one compound of the general formula II

wherein $R^3$ is H or $C_1$, $C_2$ or $C_3$ alkyl,

Y is

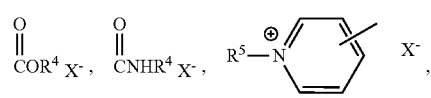

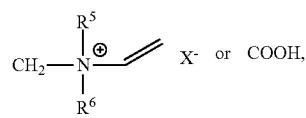

$R^4$ is an aliphatic or cycloaliphatic or aromatic rest bearing a positive charge, $R^5$ and $R^6$ are independently $C_1$ to $C_3$ alkyl, $X^-$ is an anion, with the proviso that the amount of compounds where Y is COOH does not exceed 80 molar % of the amount of compounds making up component b), c) at least one compound of the general formula III

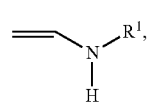

wherein the stoichiometric composition of said copolymer is reflected by the formula $A_xB_yC_z$, wherein A, B and C represent components a), b) and c) in polymerized form, and wherein the molar ratio of (x+z):y is from 5:95 to 80:20 and the molar ratio of x:z is 0 to 100000 and wherein said copolymer HP has an average molecular weight of 5,000,000 to 100,000,000.

In one embodiment, copolymer HP comprises in the form of polymerized units:

a) at least one compound of the general formula I

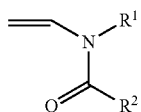

wherein $R^1$ and $R^2$ are independently H, $C_1$, $C_2$ or $C_3$ alkyl,
and b) at least one compound of the general formula II

wherein $R^3$ is H or $C_1$, $C_2$ or $C_3$ alkyl,
Y is

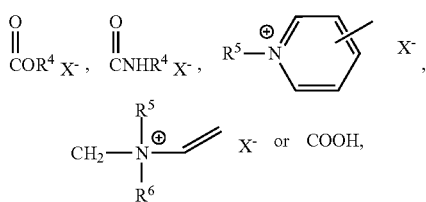

$R^4$ is an aliphatic or cycloaliphatic or aromatic rest bearing a positive charge,
$R^5$ and $R^6$ are independently $C_1$ to $C_3$ alkyl,
$X^-$ is an anion,
with the proviso that the amount of compounds where Y is COOH does not exceed 80 molar % of the amount of compounds making up component b), c) at least one compound of the general formula III

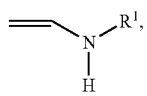

wherein the stoichiometric composition of said copolymer is reflected by the formula $A_xB_yC_z$, wherein A, B and C represent components a), b) and c) in polymerized form, and wherein the molar ratio of (x+z):y is from 5:95 to 80:20 and the molar ratio of x:z is 0 to 100000 and wherein said copolymer HP has an intrinsic viscosity from 5 to 30 dl/g.

Copolymers HP are obtainable through partial or complete hydrolysis of copolymers P using an inorganic or organic acid or base.

In a preferred embodiment, copolymers HP are obtained through partial or complete hydrolysis of copolymers P using an inorganic base.

The amount of acid or base used to hydrolyze the copolymers in solution can vary widely and is generally added in a molar ratio of from 0.05:1 to 3:1, preferably from 0.1:1 to 1:1 based on the N-vinylamide monomer content of the initially formed polymeric material. Generally, partial hydrolysis is preferably achieved with a suitable acid such as inorganic acids as, for example, hydrochloric acid, hydrobromic acid, hydrofluoric acid, sulfuric acid, nitric acid, phosphoric acid and the like, although suitable bases, such as inorganic bases as, for example, sodium hydroxide, ammonia, ammonium hydroxide, potassium hydroxide, and the like may also be used. The degree of hydrolysis can be controlled by controlling the amount of acid or base, the reaction temperature and/or the reaction time. In general, greater amounts of acid or base, higher reaction temperatures and longer reaction times result in higher degrees of hydrolysis.

It is possible that during hydrolysis of copolymer P, ester or amide groups originating from component b) can also be partially hydrolyzed. Thus, in copolymers HP, Y can also be COOH, provided that the molar ratio compounds b) bearing a COOH group (Y=COOH) does not exceed 80 molar %, preferably 50, more preferably 30 and especially preferably 10 molar % relative to the amount of component b) originally included in the polymer.

The copolymers P and HP of this invention have been found to be useful as flocculating agents to agglomerate coagulated colloidal and/or finely divided suspended matter in aqueous or non-aqueous systems such as aqueous solutions, dispersions or suspensions. Thus, another embodiment of this invention is directed to the use of copolymer P and/or HP as flocculants and to flocculants comprising copolymers P and/or HP.

Copolymers P and HP can be used alone, as mixtures of different copolymer P and/or HP or in combination with other organic polymers.

The copolymers may be added directly to the solutions containing the suspended matter, or may be pre-dissolved in a suitable miscible solvent and then added to the solution. The dosage amount of copolymer is not, per se, critical to the invention, and is generally in an amount effective to flocculate the suspended matter. Those of ordinary skill in the art can readily determine suitable dosage amounts by conventional means. Thus, while the exact dosage amount for a particular system can vary widely depending on the nature of the system and the amount of suspended matter, in general the dosage amount can range from 0.005 to 1 weight percent, preferably from 0.01 to 0.5 weight percent on the basis of the dry weight of the suspended matter.

Copolymers P and HP are particularly suitable as flocculants for any suitable suspensions in which it is desirable to concentrate the suspended solids. This includes waste waters, sludge, textile industry effluents, mineral suspensions such as red mud from Bayer Alumina Process or coal tailings, in paper mill wastes such as cellulosic sludges. Copolymers P and HP and flocculants according to the invention are particularly suitable for waste water or sludge treatment for municipal or industrial water treatment and particularly for the dewatering of sewage sludge.

The copolymers P and HP of this invention have also been found to be useful as drainage/retention aids in pulp and papermaking systems.

For the use as retention/free drainage aids, copolymers P and/or HP can for example be used in combination with microparticles. The combination of a polymeric flocculating agent with organic and/or inorganic microparticles is often referred to as a "microparticle system".

Suitable microparticles for use in this embodiment of the present invention generally include organic polymeric particles and/or inorganic colloidal particles having cationic anionic or amphoteric charged surfaces. Inorganic microparticles include, but are not limited to particulate siliceous materials, china clay, alumina, titanium, zirconium, tin, borium compounds, and the like, and mixtures thereof. The particulate siliceous materials can be selected from water swellable clay materials, colloidal silica solutions, or water dispersible siliceous materials. The water swellable clay materials are primarily smectite or vermiculite type, and are preferably the bentonite type materials. The term "bentonite" generally embraces the sheet silicates that are swellable in water.

Suitable microparticles for use in this invention also include "modified" inorganic particles wherein the ionicity of the inorganic particles is modified by contacting the particles with a low molecular weight (e.g. below 100,000), high charge density (e.g. at least 4 mEq/g) anionic copolymer such as acrylic or methacrylic polymers.

Suitable organic polymeric microparticles for use in the invention include organic polymeric microparticles which are either water dispersible or water soluble, and have an ionic surface. Organic polymeric microparticles having the above properties include, but are not limited to, various latex particles. The particle size of the microparticles of this invention is not, per se, critical to the invention provided of course that these particles can disperse or be readily dispersed into an aqueous pulp suspension in a paper making process and which do not negatively affect the surface characteristics of the final paper product. These particles, in general, will have an average dry particle size in the range 1 nm to 50 microns, and more typically from 2 nm to 10 microns.

In a preferred embodiment, the drainage/retention aids of this invention comprise a combination of an inorganic bentonite microparticle and a copolymer having a molecular weight of at least 100,000 and which has been hydrolyzed to provide a charge density between 4 and 22 mEq/g. As flocculant for sludge dewatering, copolymers P and/or HP can be used in combination with inorganic or polymeric coagulants. Suitable inorganic coagulants are for example lime, alum, ferric chloride, ferrous sulfate, ferric sulfate and sodium aluminate.

Copolymers P and/or HP are very effective and efficient flocculants, particularly for sludge dewatering. In particular, copolymers P and/or HP are very effective flocculants for sewage suspensions such as any type of sludge derived from a sewage treatment plant including digested sludge, activated sludge, raw or primary sludge or mixtures thereof.

Flocculants comprising copolymers P and/or HP show high clarification rates when used to flocculate suspended matter in water.

The dosage of copolymers H and HP required for dewatering of sludge is very low.

The cake obtained comprises only little water. The cake obtained has a high cake solid.

In particular, they allow efficient flocculation and free water separation from the sludge at low as well as at high polymer dosages.

Also, floc strengths of flocs obtained when using P or HP as flocculants are very good.

Furthermore, copolymers P and HP show only little degradation in sludge conditioning (free drainage) when the polymer is placed under mechanical pressure.

Also, copolymer P and HP help to form flocs very quickly, so that only little mixing of the sludge-polymer mixture is required for free water separation.

Copolymers P and HP can also be used as flux enhancers for membrane bioreactor application.

EXAMPLES

The following examples are provided to illustrate the present invention in accordance with the principles of this invention, but are not to be construed as limiting the invention in any way.

All parts and percentages are by weight unless otherwise indicated.
VFA: Vinyl formamide
AM: Acrylamide
DMA3Q: Acryloyloxyethyltrimethyl ammonium chloride
TAAC: Tetraallylammonium chloride
Trilon C: Diethylenetriaminepentaacetic acid
V50: 2,2'-Azobis(2-methylpropionamidine)dihydrochloride
Lutensol TO89: ethoxylated saturated iso-C13 alcohol
Span 80: Sorbitan monooleate
Exxsol D 100: Dearomatised hydrocarbon
Zetag 8185: cationic poly(acrylamide) powder flocculant based on acrylamide and DMA3Q having DMA3Q mol. % of ca. 60%
Zetag 8190: cationic poly(acrylamide) powder flocculant based on acrylamide and DMA3Q having DMA3Q mol. % of ca. 77%
Zetag 9048 FS:

Example 1

Preparation of 60 Mol % Cationic Copolymer P1 by Gel Polymerization

In a flask, 184.9 g of water, 0.4 g of a 50% by weight Trilon C solution, 36 g of vinyl formamide and 179.1 g of a 80% by weight dimethylaminoethyl acrylate methyl chloride solution in water were introduced. The pH was corrected to be between 6-6.5 and the flask was put in a cryostate to be cooled until the temperature reached 0° C. Then, the monomer solution was degassed by bubbling through of nitrogen for 30 min. 16 mL of a 1% by weight aqueous solution of 2,2'-Azobis(2-methylpropionamidine)dihydrochloride and 6 mL of tert-butyl hydroperoxide (0.1% by weight) were added. The solution was warmed to 10° C. In a second flask, 0.8 mL of sodium bisulfite (1% by weight) followed by the monomer solution were introduced. The second flask was directly placed under 4 UV Lamp (Phillips 40W-R) with an intensity of 2300 mow. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particles were observed.

The polymer obtained was suitable for use as flocculant for sludge dewatering.

Example 2

Preparation of 60 Mol % Cationic Copolymer P2 by Gel Polymerization

In a flask, 150.3 g of water, 0.4 g of a 50% by weight Trilon C solution, 36 g of vinyl formamide, 179.1 g of a 80% by weight dimethylaminoethyl acrylate methyl chloride solution in water and 12 g of a 0.1% by weight tetraallylammonium chloride solution in water were introduced. The pH was adjusted to be between 6-6.5 and the flask was put in a cryostate to be cooled until the temperature reached 0° C. Then, the monomer solution was degassed by bubbling through of nitrogen for 30 min. 16 mL of a 1% by weight aqueous solution of 2,2'-Azobis(2-methylpropionamidine) dihydrochloride and 6 mL of tert-butyl hydroperoxide (0.1% by weight) were added. The solution was warmed to 10° C. In a second flask, 0.8 mL of sodium bisulfite (1 by weight) followed by the monomer solution were introduced. The second flask was directly placed under 4 UV Lamp (Phillips 40W-R) with an intensity of 2300 mW. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particles were observed.

The polymer obtained was suitable for use as flocculant for sludge dewatering.

Example 3

Preparation of 60 Mol % Cationic Copolymer P3 by Gel Polymerization

In a flask, 146.3 g of water, 0.4 g of a 50% by weight Trilon C solution, 36 g of vinyl formamide, 179.1 g of a 80% by weight dimethylaminoethyl acrylate methyl chloride solution in water and 16 g of a 0.1% by weight tetraallylammonium chloride solution in water were introduced. The pH was adjusted to be between 6-6.5 and the flask was put in a cryostat to be cooled until the temperature reached 0° C. Then, the monomer solution was degassed by bubbling through of nitrogen for 30 min. 16 mL of a 1% by weight aqueous solution of 2,2'-Azobis(2-methylpropionamidine) dihydrochloride and 6 mL of tert-butyl hydroperoxide (0.1% by weight) were added. The solution was warmed to 10° C. In a second flask, 0.8 mL of sodium bisulfite (1% by weight) followed by the monomer solution were introduced. The second flask was directly placed under 4 UV Lamp (Phillips 40W-R) with an intensity of 2300 mW. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particles were observed.

The polymer obtained was suitable for use as flocculant for sludge dewatering.

Example 4

Polymer Evaluation of Ca. 60 Mol % Cationic VFA Copolymer Powders and Comparison to a Commercially Available 60 Mol % Cationic Polyacrylamide Powder

TABLE 1

Composition of Copolymers of Examples 1 to 3 and commercial Zetag 8185 powder based on acrylamide technology and having similar cationic composition; columns A to G of table 1: A: experiment No. or commercial product reference; B: name of first monomer, C: mass of first monomer used in grams, D: molar % age of first monomer relative to the copolymer, E: name of second monomer, F: mass of second monomer solution in grams, G: molar % age of second monomer relative to the copolymer, H: name of crosslinker, I: mass of 0.1% by weight crosslinker solution in grams, H: parts per million of crosslinker calculated over the overall monomer solution. K: Intrinsic viscosity in dL/g

| A | B | C | D | E | F | G | H | I | J | K |
|---|---|---|---|---|---|---|---|---|---|---|
| P1 | VFA | 36 | 40.5 | DMA3Q | 179.1 | 59.5 | TAAC | 0 | 0 | 13.7 |
| P2 | VFA | 36 | 40.5 | DMA3Q | 179.1 | 59.5 | TAAC | 12 | 30 | 10.5 |
| P3 | VFA | 36 | 40.5 | DMA3Q | 179.1 | 59.5 | TAAC | 16 | 40 | 10.1 |
| Zetag 8185 | AM | | 40.5 | DMA3Q | | 59.5 | | | | 14 |

Cationic copolymer of vinyl formamide and dimethylaminoethyl acrylate methyl chloride P1 exhibits similar intrinsic viscosity compared to very high molecular weight and high performance commercial cationic poly(acrylamide) Zetag 8185 powder. It demonstrates that the gel polymerization process allows to reach high molecular weight polymer P1 powder. The introduction of tetraallylammonium chloride crosslinker has an impact on the polymer structure by generating a polymer more branched. Moreover the molecular weight of the polymer increases. Up to 40 ppm of crosslinker no insoluble particle was found when the powder was dissolved in water. The effect of the crosslinker can be observed on the intrinsic viscosity values which decreased from 13.5 dL/g to 10 dL/g

Examples 5

Preparation of 77 Mol % Cationic Copolymer P5 by Gel Polymerization

In a flask, 131.2 g of water, 0.4 g of a 50% by weight Trilon C solution, 20 g of vinyl formamide, 221.7 g of an 80% by weight dimethylaminoethyl acrylate methyl chloride solution in water and 4.5 g of a 0.1% by weight tetraallylammonium chloride solution in water were introduced. The pH was corrected to be between 6-6.5 and the flask was put in a cryostate to be cooled until the temperature reached 0° C. Then, the monomer solution was degassed by bubbling through of nitrogen for 30 min. 16 mL of a 1% by weight aqueous solution of 2,2'-Azobis(2-methylpropionamidine)dihydrochloride and 6 mL of tert-butyl hydroperoxide (0.1% by weight) were added. The solution was warmed to 10° C. In a second flask, 0.8 mL of sodium bisulfite (1% by weight) followed by the monomer solution were introduced. The second flask was directly placed under 4 UV Lamp (Phillips 40W-R) with an intensity of 2300 mW. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particle was observed when the powder was dissolved in water.

The polymer obtained was suitable for use as flocculant for sludge dewatering.

Examples 6

Preparation of 77 Mol % Cationic Copolymer P6 by Gel Polymerization

In a flask, 122.4 g of water, 20 g of vinyl formamide, 221.7 g of an 80% by weight dimethylaminoethyl acrylate methyl chloride solution in water and 13.4 g of a 0.1% by weight tetraallylammonium chloride solution in water were introduced. The pH was corrected to be between 6-6.5 and the flask was put in a cryostate to be cooled until the temperature reached 0° C. Then, the monomer solution was degassed by bubbling through of nitrogen for 30 min. 16 mL of a 1% by weight aqueous solution of 2,2'-Azobis(2-methylpropionamidine)dihydrochloride and 6 mL of tert-butyl hydroperoxide (0.1% by weight) were added. The solution was warmed to 10° C. In a second flask, 0.8 mL of sodium bisulfite (1% by weight) followed by the monomer solution were introduced. The second flask was directly placed under 4 UV Lamp (Phillips 40W-R) with an intensity of 2300 mW. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particle was observed when the powder was dissolved in water.

The polymer obtained was suitable for use as flocculant for sludge dewatering.

Examples 7

Preparation of 77 Mol % Cationic Copolymer P5 by Gel Polymerization

In a flask, 118 g of water, 20 g of vinyl formamide, 221.7 g of an 80% by weight dimethylaminoethyl acrylate methyl chloride solution in water and 17.8 g of a 0.1% by weight tetraallylammonium chloride solution in water were introduced. The pH was corrected to be between 6-6.5 and the flask was put in a cryostate to be cooled until the temperature reached 0° C. Then, the monomer solution was degassed by bubbling through of nitrogen for 30 min. 16 mL of a 1% by weight aqueous solution of 2,2'-Azobis(2-methylpropionamidine)dihydrochloride and 6 mL of tert-butyl hydroperoxide (0.1% by weight) were added. The solution was warmed to 10° C. In a second flask, 0.8 mL of sodium bisulfite (1% by weight) followed by the monomer solution were introduced. The second flask was directly placed under 4 UV Lamp (Phillips 40W-R) with an intensity of 2300 mW. The polymerization started directly and reached a temperature of 80° C. within 10 minutes. After an additional 15 minutes, UV irradiation was stopped and the polymer was cooled slowly until reaching room temperature. The gel was then cut using a meat chopper and the pieces were dried at 80° C. for two hours. Afterwards, the solid product was ground to generate a powder having an average particle size of approximately 0.5-1 mm.

The polymer obtained was fully water soluble and no insoluble particle was observed when the powder was dissolved in water.

The polymer obtained was suitable for use as flocculant for sludge dewatering.

Example 8

Polymer Evaluation of Ca. 77 Mol % Cationic VFA Copolymer Powders and Comparison to a Commercially Available 77 Mol % Cationic Polyacrylamide Powder

TABLE 2

Composition of Copolymers of Examples 5 to 7 and commercial Zetag 8190 powder based on acrylamide technology and having similar cationic composition; columns A to G of table 2: A: experiment No. or commercial product reference; B: name of first monomer, C: mass of first monomer used in grams, D: molar % age of first monomer relative to the copolymer, E: name of second monomer, F: mass of second monomer solution in grams, G: molar % age of second monomer relative to the copolymer, H: name of crosslinker, I: mass of 0.1% by weight crosslinker solution in grams, H: parts per million of crosslinker calculated over the overall monomer solution. K: Intrinsic viscosity in dL/g

| A | B | C | D | E | F | G | H | I | J | K |
|---|---|---|---|---|---|---|---|---|---|---|
| P5 | VFA | 20 | 23.2 | DMA3Q | 221.7 | 76.8 | TAAC | 4.5 | 11 | 8.6 |
| P6 | VFA | 20 | 23.2 | DMA3Q | 221.7 | 76.8 | TAAC | 13.4 | 33 | 8.5 |
| P7 | VFA | 20 | 23.2 | DMA3Q | 221.7 | 76.8 | TAAC | 17.8 | 44 | 7.2 |
| Zetag 8190 | AM | | 23.2 | DMA3Q | | 76.8 | | | | 9 |

Cationic copolymer of vinyl formamide and dimethylaminoethyl acrylate methyl chloride P5 exhibits similar intrinsic viscosity compared to very high molecular weight and high performance commercial cationic poly(acrylamide) Zetag 8190 powder. It demonstrates that the gel polymerization process allows to reach high molecular weight polymer P5 powder. The introduction of tetraallylammonium chloride crosslinker has an impact on the polymer structure by generating a polymer more branched. Moreover the molecular weight of the polymer increases. Up to 44 ppm of crosslinker no insoluble particle was found when the powder was dissolved in water. The effect of the crosslinker can be observed on the intrinsic viscosity values which decreased from 8.6 dL/g to 7.2 dL/g

Example 9

Preparation of a 60 Mol % Cationic Copolymer P9 by Inverse Emulsion Polymerization Oil Phase In a beaker, 182.0 g of Exxsol D 100 and 16.1 g of Span 80 were mixed to a homogenous solution.

Water Phase

In a flask, 77.80 g of water, 69.92 g of vinyl formamide, 343.51 g of an 80% by weight dimethylaminoethyl acrylate methyl chloride solution in water and 0.128 g of a 40% by weight tetra allylammonium chloride solution in water were introduced.

Preparation of the Emulsion

The oil phase was in put in a beaker and stirred slowly with a Silverson homogenizer and the water phase was added. The emulsion was then stirred for 3 min at 8000 rpm.

Polymerization

The emulsion was transferred to a 2 L reactor was stirred at 300 rpm. Nitrogen was sparged through the emulsion for one hour and cooled to 10° C. Then the polymerization was started by parallel dosage of two solutions A and B. The solution A was composed of 9.0 g of a 1% by weight aqueous solution of sodium sulfite and 0.05 g of a 1.0% by weight aqueous solution of ferrous ammonium sulfate. The solution B was 5 g a 1% by weight aqueous solution tert-butyl hydroperoxide. The dosage was done by a peristaltic pump. The dosage speed was adjusted so that the temperature rose from 10° C. to 40° C. within 30 min. After that the dosage was completed over one hour and the temperature was kept at 40° C.

After cooling to room temperature 15.0 g of Lutensol TO89 was added to invert the emulsion.

The polymer obtained was suitable for use as flocculant for sludge dewatering.

Example 10

Polymer Evaluation of an Inverse Emulsion Ca. 60 Mol % Cationic VFA Copolymer and Comparison to a Commercially Available 60 Mol % Cationic Polyacrylamide Inverse Emulsion

TABLE 3

Composition of Copolymers of Examples 10 and commercial Zetag 9048 FS inverse emulsion based on acrylamide technology and having similar cationic composition; columns A to G of table 3: A: experiment No. or commercial product reference; B: name of first monomer, C: mass of first monomer used in grams, D: molar % age of first monomer relative to the copolymer, E: name of second monomer, F: mass of second monomer solution in grams, G: molar % age of second monomer relative to the copolymer, H: name of crosslinker, I: mass of 40% by weight crosslinker solution in grams, H: parts per million of crosslinker calculated over the over-all monomer solution. K: Intrinsic viscosity in dL/g

| A | B | C | D | E | F | G | H | I | J | K |
|---|---|---|---|---|---|---|---|---|---|---|
| P9 | VFA | 36 | 40.5 | DMA3Q | 179.1 | 59.5 | TAAC | 0.13 | 150 | 6.1 |
| Zetag 9048 | AM | | 40.5 | DMA3Q | | 59.5 | | | | 7 |

Cationic copolymer of vinyl formamide and dimethylaminoethyl acrylate methyl chloride P9 exhibits similar intrinsic viscosity compared to very high molecular weight and high performance commercial cationic poly(acrylamide) Zetag 9048 FS inverse emulsion. It demonstrates that the inverse emulsion polymerization process developed allows to reach high molecular weight and structured polymer P9.

Example 11

Dewatering of Aqueous Suspensions Via Direct Addition of Organic Polymer Flocculant Polymer Solutions Preparation Polymer solutions for samples in a solid form (powder and bead) were prepared at a concentration of 0.4% using the following procedure. To generate 1000 g of polymer solution, 4 g of powder were accurately weighed and put in a flask with screw cap. 5 mL of acetone were added. The flask was sealed and shaken gently for a complete wetting of the polymer with acetone. 991 g of demineralized water were introduced and the flask was sealed. The dispersion was shaken until all polymeric particulates were completely dispersed in the media. Then the flask was put on a tumbler with a rotation speed of 30 rpm for at least 2 hours and typically overnight until complete dissolution of the material. Polymer solutions were used fresh within 24 hours.

Polymer solutions for samples in a liquid form (inverse emulsion) were prepared at a concentration of 0.4% by weight based on active polymer content using the following procedure. For instance, to obtain 500 g of polymer solution for an inverse emulsion having an active polymer content of 50%, 496 g of demineralized water were introduced in a beaker glass and stirred at 500 rpm using a mechanical stirrer. 4 g of activated inverse emulsion were introduced to the water drop by drop using a syringe under stirring. After complete addition, the solution was stirred for another 2H at the same speed and then introduced in a flask with a screw cap. Then the flask was put on a tumbler with a rotation speed of 30 rpm for at least 2H and typically overnight until complete dissolution of the material. Polymer solutions were used fresh within 24 hours.

Experimental Procedure

The sludge used for the experiments was a digested sludge taken in a municipal water-treatment plant on the river Inn in Germany.

Free drainage curve determination. In a plastic beaker were introduced 250 mL of sludge, X g of polymer solution and (250−X) g of water, with X being a weight between 20 and 50 g. The sludge was flocculated by stirring at 6000 rpm for 10 s using a mixer and mixing paddle. The suspension was poured into a filtration cell, which had a filter membrane, comprising a belt-press filter cloth and the filtrate collected in a measuring cylinder. Filtrate volumes were recorded after 5 s using a data recording program Sarto Connect from Sartorius which monitored online the weight difference of the balance.

This test was performed at least 8 times at different polymer solution dosages to elaborate a reliable dosage curve. The maximum filtrate volume is defined as the optimum of the dosage curve. The optimum polymer dosage is defined as the polymer dose necessary to reach the maximum filtrate volume.

Cake solid determination. From the free drainage curve, the optimum polymer dosage was obtained for a specific polymer. The Flocculation test was reproduced twice at the optimum polymer dosage to get two samples for the cake solid determination. After 1 minute of dewatering in the filtration cell, all the thickened sludge was transferred into the piston press device and subjected to a compression dewatering stage. A pressure of 7 bar was applied for 15 minutes when the pressure was constant. Then the wet cake was removed and the cake solids content was determined by gravimetric measurement in an oven overnight at 110° C. The cake solid value is defined as the average of the two gravimetric measurements.

TABLE 4

Flocculation performance of Copolymers of Examples 6 and 10 compared to copolymers based on AM; columns A to D of table 4:
A: experiment No. or commercial product reference; B: Maximum filtrate volume in milliliters, C: optimum dosage in kilogram per ton of dried matter suspended in the sludge, D: cake solid in percent

| A | B | C | D |
|---|---|---|---|
| P6 | 18 | 135 | 19.1 |
| Zetag 8190 | 17.5 | 140 | 17.7 |
| P10 | 24 | 150 | 18 |
| Zetag 9048 | 26 | 140 | 17.2 |

High molecular weight 90% by weight cationic poly(vinyl formamide) powder P6 exhibited similar dosage and maximum filtrate volume compared to commercial high performance 90% by weight cationic poly(acrylamide) powder Zetag 8190. However, the cake solid of the vinyl formamide copolymer had an improved cake solid which is highly desired to reduce the volume of waste in the water treatment plant. The inverse emulsion 80% by weight cationic poly (vinyl formamide) P10 exhibited a better and faster water released (maximum filtrate volume) compared to Zetag 9048 FS at a lower dosage which is more economical for the user. Moreover, the waste generated was found to have a lower moisture content which has a positive impact on the volume generated.

Determination of molecular weight by light scattering was done using a field flow fractionation apparatus from Eclipse coupled with a multi-angle Light scattering detector from Dawn EOS and a refractive index detector optilab DSP from Wyatt. A 0.5 M NaNO3 solution is used to dilute the polymer at a concentration of 0.3 g/L. Then 30 to 50 μL of polymer solution was injected. A dn/dc of 0.150 mL/g was taken for all the samples to allow the molecular weight determination.

EMBODIMENTS

1. A copolymer P comprising in the form of polymerized units
c) at least one compound of the general formula I

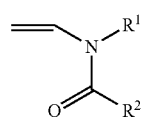

wherein $R^1$ and $R^2$ are independently H, $C_1$, $C_2$ or $C_3$ alkyl,
and
d) at least one compound of the general formula II

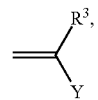

wherein $R^3$ is H or $C_1$, $C_2$ or $C_3$ alkyl,
Y is

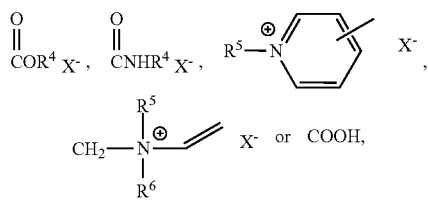

$R^4$ is an aliphatic or cycloaliphatic or aromatic rest bearing a positive charge,
$R^5$ and $R^6$ are independently $C_1$ to $C_3$ alkyl,
$X^-$ is an anion,
wherein the molar ratio of components a) to b) is 5:95 to 45:65.

2. A copolymer P comprising in the form of polymerized units
a) at least one compound of the general formula I

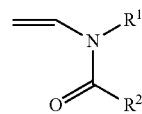

wherein $R^1$ and $R^2$ are independently H, $C_1$, $C_2$ or $C_3$ alkyl,
and
b) at least one compound of the general formula II

wherein $R^3$ is H or $C_1$, $C_2$ or $C_3$ alkyl,
Y is

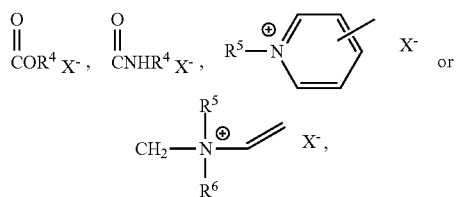

$R^4$ is an aliphatic or cycloaliphatic or aromatic rest bearing a positive charge, $R^5$ and $R^6$ are independently $C_1$ to $C_3$ alkyl,
$X^-$ is an anion,
wherein the molar ratio of components a) to b) is 5:95 to 80:20,
and wherein said copolymer P has an average molecular weight Mw of 5,000,000 to 100,000,000.

3. A copolymer P comprising in the form of polymerized units
a) at least one compound of the general formula I

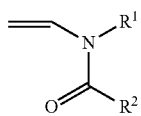

wherein $R^1$ and $R^2$ are independently H, $C_1$, $C_2$ or $C_3$ alkyl,
and
b) at least one compound of the general formula II

wherein $R^3$ is H or $C_1$, $C_2$ or $C_3$ alkyl,
Y is

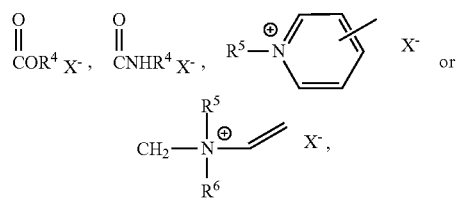

$R^4$ is an aliphatic or cycloaliphatic or aromatic rest bearing a positive charge,
$R^5$ and $R^6$ are independently $C_1$ to $C_3$ alkyl,
$X^-$ is an anion,
wherein the molar ratio of components a) to b) is 5:95 to 80:20,
and wherein said copolymer P has an intrinsic viscosity from 3 to 30 dl/g.

4. A copolymer according to one of the preceding embodiments, wherein component b) bears a quarternary ammonium group.

5. A Copolymer according to one of the preceding embodiments, wherein component b) is an ester or an amide of acrylic acid or methacrylic acid.

6. A Copolymer according to one of the preceding embodiments, wherein component b) is selected from

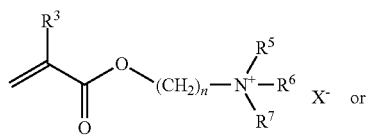

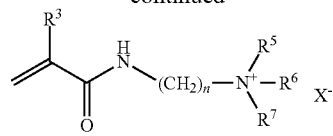

wherein $R^3$ is H or $C_1$, $C_2$ or $C_3$ alkyl, $R^5$, $R^6$ and $R^7$ are independently $C_1$ to $C_3$ alkyl, n is a number from 1 to 8, $X^-$ is an anion.

7. A Copolymer according to one of the preceding embodiments, wherein component a) is Vinylformamide 8. A process for the manufacture of Copolymers P according to any of the preceding embodiments, wherein said copolymers are made by inverse emulsion polymerization or gel polymerization or bead polymerization.

9. A process for the manufacture of Copolymers P according to any of the preceding embodiments, wherein the polymerization is initiated by thermal initiators, redox initiators, UV irradiation or microwaves or combinations thereof.

10. A copolymer HP comprising in the form of polymerized units:
a) at least one compound of the general formula I

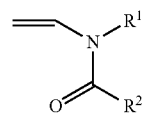

wherein $R^1$ and $R^2$ are independently H, $C_1$, $C_2$ or $C_3$ alkyl,
and
b) at least one compound of the general formula II

wherein $R^3$ is H or $C_1$, $C_2$ or $C_3$ alkyl,
Y is

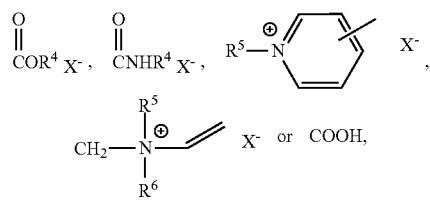

$R^4$ is an aliphatic or cycloaliphatic or aromatic rest bearing a positive charge,
$R^5$ and $R^6$ are independently $C_1$ to $C_3$ alkyl,
$X^-$ is an anion,
with the proviso that the amount of compounds where Y is COOH does not exceed 80 molar % of the amount of compounds making up component b), c) at least one compound of the general formula III

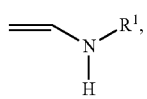

wherein the stoichiometric composition of said copolymer is reflected by the formula $A_xB_yC_z$, wherein A, B and C represent components a), b) and c) in polymerized form, and wherein the molar ratio of (x+z):y is from 5:95 to 45:65 and the molar ratio of x:z is 0 to 100000.

11. A copolymer HP comprising in the form of polymerized units:
    d) at least one compound of the general formula I

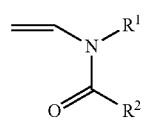

wherein $R^1$ and $R^2$ are independently H, $C_1$, $C_2$ or $C_3$ alkyl,
and
e) at least one compound of the general formula II

wherein $R^3$ is H or $C_1$, $C_2$ or $C_3$ alkyl,
Y is

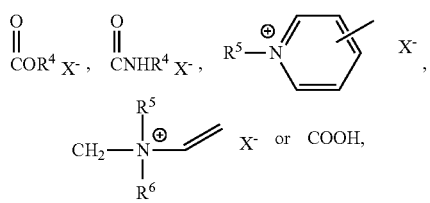

$R^4$ is an aliphatic or cycloaliphatic or aromatic rest bearing a positive charge,
$R^5$ and $R^6$ are independently $C_1$ to $C_3$ alkyl,
$X^-$ is an anion,
with the proviso that the amount of compounds where Y is COOH does not exceed 80 molar % of the amount of compounds making up component b),
f) at least one compound of the general formula III

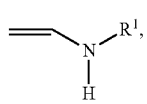

wherein the stoichiometric composition of said copolymer is reflected by the formula $A_xB_yC_z$, wherein A, B and C represent components a), b) and c) in polymerized form, and wherein the molar ratio of (x+z):y is from 5:95 to 80:20 and the molar ratio of x:z is 0 to 100000 and wherein said copolymer HP has an average molecular weight of 5,000,000 to 100,000,000.

12. A process for the manufacture of Copolymers HP according to embodiments 10 or 11, wherein said copolymer HP is obtained by partial or complete hydrolysis of copolymers according to embodiments 1 to 5.

13. Flocculants comprising copolymers according to embodiments 1 to 7 and/or copolymers HP according to embodiments 10 to 11.

14. Use of copolymers according to embodiments 1 to 7 or 10 to 11 as drainage/retention aids in the manufacture of paper or paperboard or for sludge dewatering in waste water treatment or as a flux enhancer for membrane bioreactor applications.

We claim:
1. A method, comprising:
    mixing a copolymer P with water comprising suspended colloidal matter and finely divided suspended matter, thereby coagulating and flocculating the colloidal matter and finely divided suspended matter in the water,
    said copolymer P consisting of, in polymerized form:
    a) at least one compound of the general formula I

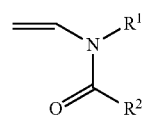

wherein $R^1$ and $R^2$ are independently H, $C_1$, $C_2$ or $C_3$ alkyl, and
b) at least one compound of the general formula II

wherein $R^3$ is H or $C_1$, $C_2$ or $C_3$ alkyl,
Y is

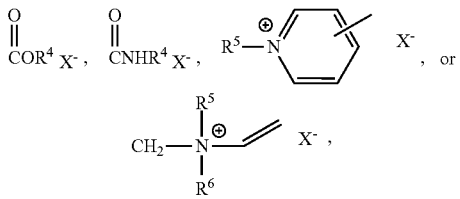

$R^4$ is an aliphatic or cycloaliphatic or aromatic group bearing a positive charge,
$R^5$ and $R^6$ are independently $C_1$ to $C_3$ alkyl,
$X^-$ is an anion,
wherein the molar ratio of components a) to b) is 5:95 to 45:65,
and wherein copolymer P is free from acrylamide.

2. The method according to claim 1, wherein the molar ratio of components a) to b) is 10:90 to 40:60.

3. The method according to claim 1, wherein the molar ratio of components a) to b) is 15:85 to 30:70.

4. The method according to claim 1, wherein component b) is an ester or an amide of acrylic acid or methacrylic acid.

5. The method according to claim 1, wherein component b) represents

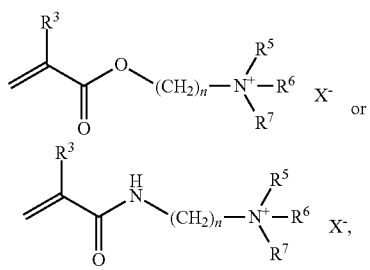

wherein $R^3$ is H or $C_1$, $C_2$ or $C_3$ alkyl, $R^5$, $R^6$ and $R^7$ are independently $C_1$ to $C_3$ alkyl, n is a number from 1 to 8, and $X^-$ is an anion.

6. The method according to claim 5, wherein each of $R^5$, $R^6$ and $R^7$, independently, represents a methyl group or an ethyl group.

7. The method according to claim 5, wherein each of $R^5$, $R^6$ and $R^7$ represents a methyl group.

8. The method according to claim 1, wherein said copolymer P is mixed with said water in an amount of from 0.005 to 1 weight percent, on the basis of the dry weight of the suspended matter in the water.

9. The method according to claim 1, wherein said copolymer P is mixed with said water in an amount of from 0.01 to 0.5 weight percent, on the basis of the dry weight of the suspended matter in the water.

* * * * *